(12) United States Patent
Jackson

(10) Patent No.: US 7,347,800 B2
(45) Date of Patent: Mar. 25, 2008

(54) MULTI-SPEED POWER SPLITTING CVT

(75) Inventor: Graeme A. Jackson, Kalamazoo, MI (US)

(73) Assignee: Eaton Corporation, Cleveland, OH (US)

(*) Notice: Subject to any disclaimer, the term of this patent is extended or adjusted under 35 U.S.C. 154(b) by 139 days.

(21) Appl. No.: 11/351,507

(22) Filed: Feb. 10, 2006

(65) Prior Publication Data
US 2006/0183590 A1    Aug. 17, 2006

Related U.S. Application Data

(60) Provisional application No. 60/652,337, filed on Feb. 11, 2005.

(51) Int. Cl.
*F16H 37/02* (2006.01)
(52) U.S. Cl. ..................................... 475/210
(58) Field of Classification Search ................ 475/210, 475/211
See application file for complete search history.

(56) References Cited

U.S. PATENT DOCUMENTS

| | | | |
|---|---|---|---|
| 3,605,522 A * | 9/1971 | Grosseau | 475/53 |
| 5,803,858 A | 9/1998 | Haka | |
| 5,888,161 A | 3/1999 | McCarrick | |
| 5,916,053 A | 6/1999 | McCarrick | |
| 5,931,760 A | 8/1999 | Beim | |
| 5,937,711 A | 8/1999 | McCarrick | |
| 5,941,789 A | 8/1999 | McCarrick | |
| 5,961,414 A | 10/1999 | Beim | |
| 6,001,042 A | 12/1999 | Raney | |
| 6,036,616 A | 3/2000 | McCarrick | |
| 6,093,125 A | 7/2000 | McCarrick | |
| 6,447,422 B1 | 9/2002 | Haka | |
| 6,986,725 B2 | 1/2006 | Morscheck | |

OTHER PUBLICATIONS

"How to Convert a CVT into a IVT" http://cvt.com.sapo.pt/ivt/ivt.htm Jan. 18, 2005 (date printed).

* cited by examiner

*Primary Examiner*—Dirk Wright
(74) *Attorney, Agent, or Firm*—Kevin M. Hinman

(57) ABSTRACT

A power splitting CVT has a planetary mixer and variator. An input shaft is drivingly connected to a planet carrier. A plurality of planet gears are mounted to the carrier engaging both a sun gear on an inside diameter and a ring gear on an outside diameter. The ring gear is fixed to an output shaft of the CVT. A speed-up gearing drivingly connects the sun gear with a variator input shaft. The variator is disposed between the variator input shaft and a variator output shaft. A speed-down gearing drivingly connects the variator output shaft to the transmission output shaft. One of the speed-down gearing and the speed-up gearing provide a plurality of fixed ratios between the variator output shaft and the transmission output shaft and between the variator input shaft and the sun gear respectively.

4 Claims, 3 Drawing Sheets

MULTI-SPEED POWER SPLITTING CVT

RELATED APPLICATIONS

This application claims the benefit of U.S. Provisional Application No. 60/652,337, filed Feb. 11, 2005 entitled "Multi-Speed Power Splitting CVT", which is incorporated herein by reference in its entirety.

FIELD OF THE INVENTION

The present invention is directed to the field of vehicle transmissions, and more particularly to power splitting continuously variable transmissions (CVTs).

BACKGROUND OF THE INVENTION

Prior art power splitting CVTs are not optimized with respect to efficiency for particular usage demands.

SUMMARY OF THE INVENTION

The present invention presents a particularly advantageous arrangement of a CVT having a planetary mixer system and variator. The CVT beneficially has an input shaft drivingly connected to a planet carrier, a plurality of planet gears mounted to the carrier engaging both a sun gear on an inside diameter and a ring gear on an outside diameter. The ring gear is fixed to an output shaft of the CVT. A speed-up gearing drivingly connects the sun gear with a variator input shaft. A variator is disposed between the variator input shaft and a variator output shaft. A speed-down gearing drivingly connects the variator output shaft to the transmission output shaft. One of the speed-down gearing and the speed-up gearing provide a plurality of fixed ratios between the variator output shaft and the transmission output shaft and between the variator input shaft and the sun gear respectively.

In one embodiment, the sun gear is coaxially fixed to a speed-up gearset drive gear. A driven gear of the speed-up gearset is in mesh with the drive gear of the speed-up gearset, and is fixed to a variator input shaft. The variator output shaft is connected to drive gears of first and second speed-down gearsets. The speed-down gearing provides a plurality of fixed ratios between the variator output shaft and the transmission output shaft. The speed-down gearing includes a first gear set and a second gear set. Each of the first gearset and the second gearset has a drive gear fixed to the variator output shaft. Each of the first gearset drive gear and the second gearset drive gear meshes with a first gearset driven gear and a second gearset driven gear respectively. One or neither of the first and the second gearset driven gear are selectively rotatively fixed to the transmission output shaft by a clutching element to provide one of a high speed operating range, a low speed operating range or a neutral condition.

DETAILED DESCRIPTION

The present invention incorporates by reference the disclosure of U.S. Pat. No. 6,986,725.

Figure 1:
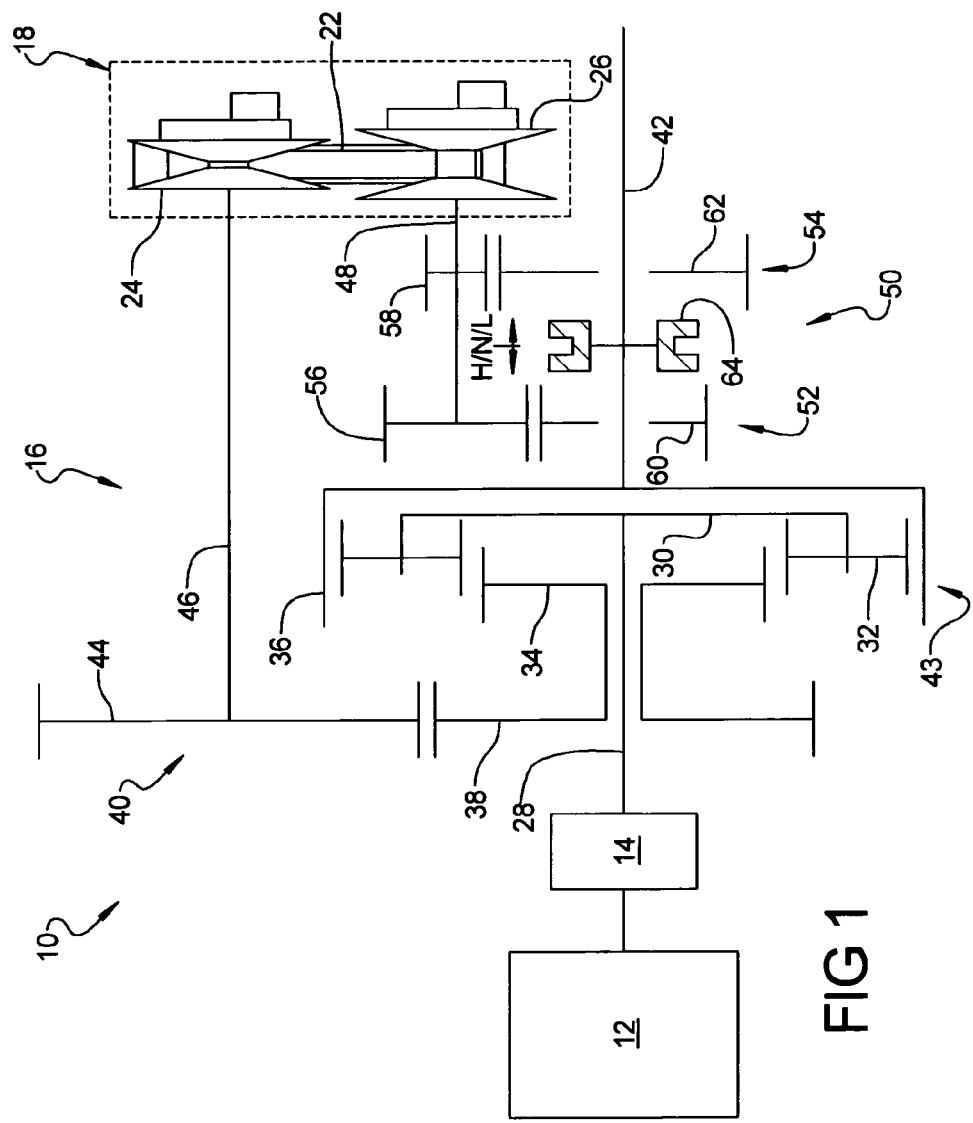
FIG. 1 is a schematic diagram of a drivetrain system including an engine, a CVT and a master clutch.

FIG. 1 shows a schematic of a drivetrain system 10 employing the present invention. The vehicle drivetrain system includes an engine 12, a master clutch 14 and a CVT 16.

The CVT 16 includes a number of shafts and gearsets and a variator 18 providing a power splitting arrangement. The variator shown is a pulley-type variator in which the ratio can be continuously varied by changing the distance between the flanges of each of the pulleys as described in the above referenced patent. A belt or chain 22 is disposed between an input pulley 24 and an output pulley 26. The CVT 16 described herein varies from the CVT in the above incorporated patent application in the arrangement and details of the powersplitting arrangement.

The axes of rotation of all of the shafts and gears are parallel or essentially parallel. The CVT 16 beneficially has an input shaft 28 drivingly connected to a planet carrier 30, a plurality of planet gears 32 mounted to the carrier 30 engaging both a sun gear 34 on an inside diameter and a ring gear 36 on an outside diameter. The sun gear 34 is coaxially fixed to a drive gear 38 of a speed-up gearing 40. The ring gear 36 is fixed to an output shaft 42 of the CVT 16. Planet gears 32, carrier, 30, sun gear 34 and ring gear 36 together comprise an epicyclic or planetary gearset 43. A driven gear 44 of the speed-up gearing 40 is in mesh with the drive gear 38 of the speed-up gearset, and is fixed to a variator input shaft 46. While gearing 40 as described comprises only one set of gears 38 and 44, it could alternatively comprise multiple gear sets.

The variator 18 is disposed between the variator input shaft 46 and a variator output shaft 48. The variator output shaft 48 is connected to a speed-down gearing 50 drivingly connecting the variator output shaft to the transmission output shaft 42.

The speed-down gearing 50 provides a plurality of fixed ratios between the variator output shaft 48 and the transmission output shaft 42. In a preferred embodiment, the speed-down gearing 50 includes a first gear set 52 and a second gear set 54. Each of the first gearset 52 and the second gearset 54 has a drive gear 56 and 58 respectively fixed to the variator output shaft 48. Each of the first gearset drive gear 56 and the second gearset drive gear 58 meshes with a first gearset driven gear 60 and a second gearset driven gear 62 respectively. One or neither of the first and the second gearset driven gear are selectively rotatively fixed to the transmission output shaft by a clutching element 64 to provide one of a high speed operating range, a low speed operating range or a neutral condition. In FIG. 1, the high speed operating range is achieved by sliding the clutching element 64 to the left; the low speed operating range is achieved by sliding the clutching element to the right, and the neutral condition is achieved by positioning the sleeve in the center, permitting relative rotation of both driven gears 60 and 62 relative to shaft 42.

The present invention uses the epicyclic, or planetary gear set 43, to run the variator 18 at more nearly optimal torques and speeds for improved efficiency. The power through the variator 18 decreases as road speed, which is directly proportional to output shaft speed 42, increases. This is advantageous for both fuel economy and variator life. The multiple speed-down section 50 advantageously provides two available ratio ranges for increased ratio coverage where the prior art provided only one. Two ratio ranges can alternatively be achieved by multiple speed up gearing on the input side of the variator (not shown) or a combination of multiple speed-up gearing and the illustrated multiple speed-down gearing. An important feature of this invention is the location of the multiple speed ratios within the power splitting section of the CVT. Changing ratio in the power splitting section optimizes ratio coverage for each range. For example, the low range can have a ratio coverage of 4:1 whilst the high range can have a ratio coverage of 2:1, for an overall ratio coverage of 8:1.

The inventive system may be used as a complete vehicle transmission as shown above, with the output shaft 42 drivingly connected to a vehicle drive axle (not shown). If a greater range of gear ratios is needed, particularly if it is desired to have a significantly higher level of torque at the output shaft in the low range, then it may be desirable to have the output shaft 42 connecting to a stepped ratio gear box or transmission as described in the above referenced U.S. Pat. No. 6,986,725. The output shaft of the gearbox would then connect to the vehicle drive axle.

Figure 2:
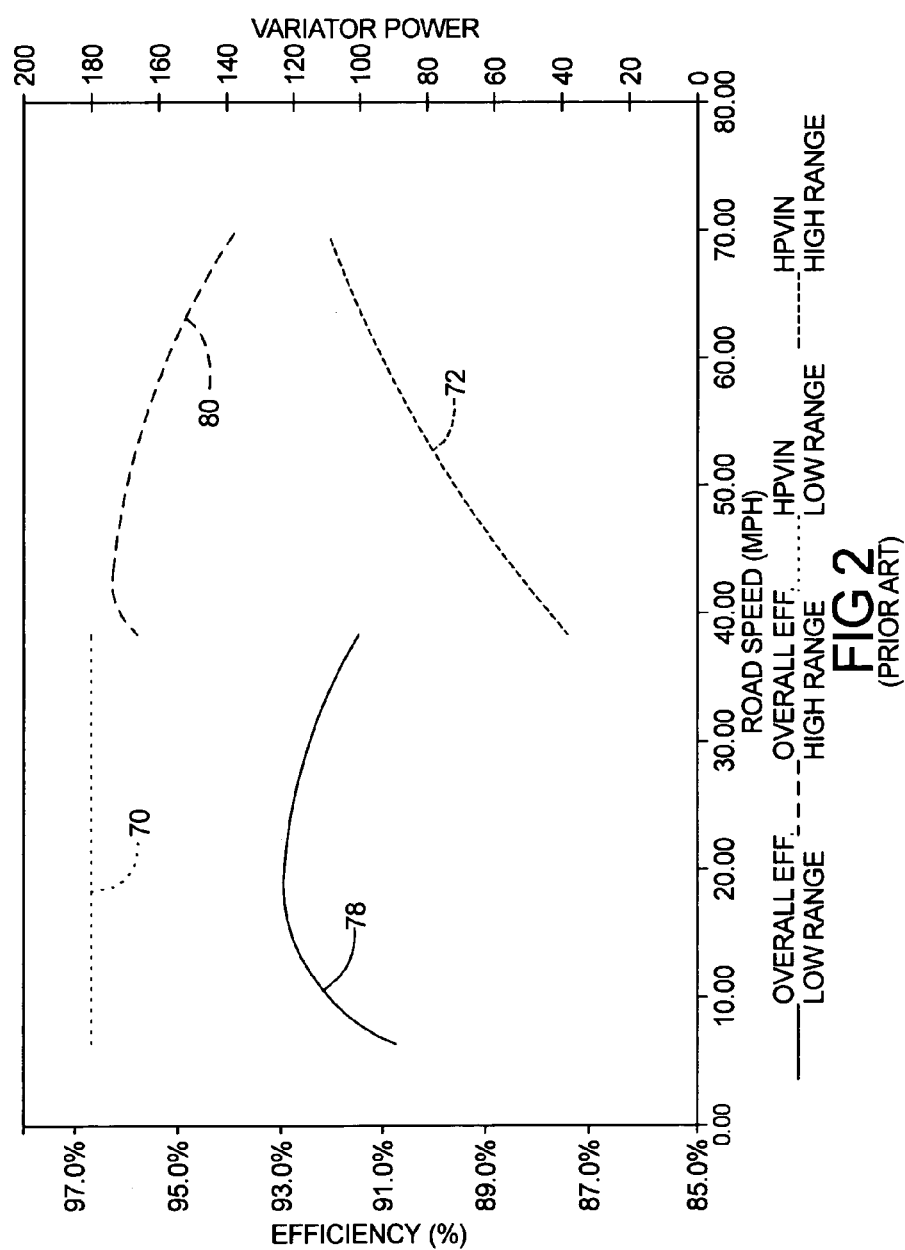
FIG. 2 is a chart showing estimated efficiency and variator power of the prior art.
Figure 3:
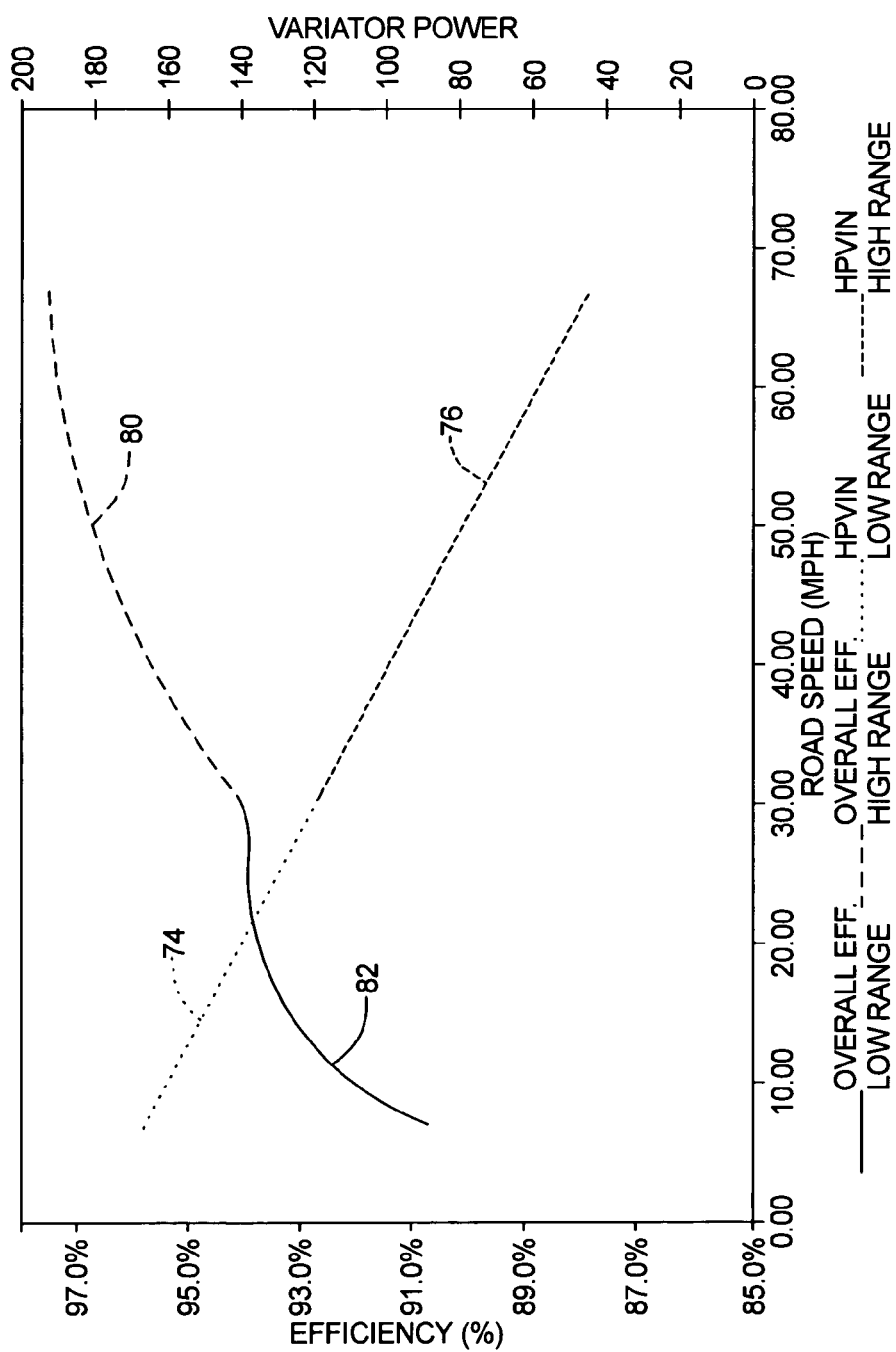
FIG. 3 is a chart showing estimated efficiency and variator power of the present invention.

The benefits of the present invention are in part more clearly understood by comparing FIG. 2 and FIG. 3. In FIG. 2, the power into the variator 18 of a prior art CVT, Hpvin Low Range 70 in a speed range up to approximately 40 miles per hour (mph) and Hpvin High Range 72 beyond 40 mph is discontinuous, being held at a very high level at low speeds, and dropping dramatically. The high sustained power going into the variator at low speeds results in a need to provide a variator capable of sustaining such loads. In contrast, as shown in FIG. 3, the power into the variator 18 of the inventive arrangement, Hpvin Low Range 74 and Hpvin High Range 76, described and illustrated herein enables the power into the variator to be gradually decreased as vehicle speed increases. Similarly, in FIG. 2 the plots of efficiency at low speed and at high speed 78 and 80 respectively are discontinuous for the prior art, while the present invention's plots in FIG. 3 of efficiency at low speed and at high speed 82 and 84 respectively, are continuous. Being able to shift from a low speed mode to a high speed mode within the CVT enables the smooth transition in loading. In the exemplary embodiment, the shifting is achieved using clutching element 64, but alternatively be achieved could be achieved with a clutching element disposed on shaft 46, with a pair of gear sets in place of gear set 40.

Additional alternative configurations can be used to exploit the inventions disclosed herein. For example, the two discrete output ratios could potentially be provided by alternative means to the illustrated countershaft arrangement by providing a planetary system employing wet clutches for selective engagement of a high and a low ratio.

The invention is defined by the below claims.

I claim:

1. A transmission having a planetary mixer system and variator comprising:
   an input shaft;
   an output shaft;
   a planet carrier drivingly connected to the input shaft;
   a plurality of planet gears mounted to the carrier;
   a sun gear engaging the planet gears on an inside diameter;
   a ring gear concentric with and fixed to the output shaft and engaging the planet gears on an outside diameter;
   a speed-up gearing drivingly connecting the sun gear and a variator input shaft;
   a variator is disposed between the variator input shaft and a variator output shaft;
   a speed-down gearing drivingly connecting the variator output shaft to the transmission output shaft; and
   one of the speed down gearing and the speed-up gearing providing a plurality of fixed ratios between the variator output shaft and the transmission output shaft and between the variator input shaft and the sun gear respectively.

2. A transmission as claimed in claim 1, further comprising:
   the speed-down gearing providing the plurality of fixed ratios between the variator output shaft and the transmission output shaft.

3. A transmission as claimed in claim 1, one of the speed-down gearing and the speed-up gearing comprising a first gear set and a second gear set with a clutching element providing the plurality of fixed ratios.

4. A transmission as claimed in claim 1, the speed-down gearing comprising a first gear set and a second gear set with a clutching element providing the plurality of fixed ratios.

* * * * *